Aug. 9, 1932.  H. M. STOLLER  1,871,347

CONSTANT SPEED MOTOR

Filed Oct. 1, 1930

INVENTOR
H. M. STOLLER
BY Wayne B Wells
ATTORNEY

Patented Aug. 9, 1932

1,871,347

UNITED STATES PATENT OFFICE

HUGH M. STOLLER, OF MOUNTAIN LAKES, NEW JERSEY, ASSIGNOR TO BELL TELEPHONE LABORATORIES, INCORPORATED, OF NEW YORK, N. Y., A CORPORATION OF NEW YORK

CONSTANT SPEED MOTOR

Application filed October 1, 1930. Serial No. 485,577.

This invention relates to constant speed motors, and particularly to direct current motors inherently operated at constant speed with fairly close precision.

One object of the invention is to provide a direct current motor that shall apply a field flux to the armature in direct proportion to the line voltage applied to the armature.

Another object of the invention is to provide a direct current motor that shall compensate the motor speed for line voltage variations, load variations, hysteresis effects in the field circuit and changes in the resistance of the field circuit due to temperature variations.

Another object of the invention is to provide a direct current motor with a field core structure that shall compensate for hysteresis effects and that shall apply a field flux to the armature in direct proportion to the line voltage applied to the armature.

A further object of the invention is to provide a shunt-wound direct-current motor that shall shunt a portion of the field flux away from the armature to insure the field flux applied to the armature varying proportionally to the line voltage applied to the armature.

A commercial type of shunt wound direct current motor will vary in speed due to line voltage changes, changes in temperature of the motor, load changes, and hysteresis effects caused by changes in the field current. The speed variations caused by the above mentioned changes will at times prohibit the use of such motor for purposes requiring the speed held constant with fairly close precision. As an example may be mentioned the operation of machines for reproducing sound pictures. In the operation of machines for reproducing sound pictures the speed variations of the propelling motor must be held under 1% to prevent interfering with the quality of the reproduction.

In a motor constructed according to the invention correction is made to hold the motor speed variations under 1% irrespective of the line voltage changes, load changes, temperature changes and hysteresis effects. The speed of the motor is held constant with fairly close precision and although particularly adapted for sound picture reproduction may be used for other purposes where constant speed with fairly close precision is required.

In a motor of the type under consideration it is known that the speed will be constant if the flux applied to the armature is proportionate to the line voltage applied to the armature. The magnetization curve of an ordinary shunt wound motor has such a slope that no extended portion thereof lies on a straight line extending through the origin of the curve. It is impossible to operate the commercial type of motor so that the field flux applied to the motor is in direct proportion to the line voltage applied to the motor.

In order to obtain a motor having a magnetization curve with a portion thereof at reasonably high flux densities approximately on a straight line extending through the origin of the magnetization curve, magnetic shunts are associated with the field poles of the motor. Such magnetic shunts prevent a portion of the field flux being applied to the armature. The effect of such shunts is to displace the magnetization curve of the motor so that a portion thereof at reasonably high flux densities will be approximately on a straight line extending through the origin of the magnetization curve. In order to raise the flux density at which the motor operates magnetic gaps are provided in the field structure. Such magnetic gaps are preferably formed of some nonmagnetic material such as copper or brass. The providing of a non-magnetic gap in the pole structure is the invention of E. R. Morton and is disclosed and claimed in the application of E. R. Morton Serial No. 483,798, filed September 23, 1930.

In an ordinary shunt wound motor the field flux is not solely a function of the line voltage at any instant. One reason being the effect of hysteresis in the field circuit. The magnetization curve for such a motor is not the same during rising line voltage as during falling line voltage. In order to take care of the discrepancies in the motor speed caused by hysteresis, the field magnetic structure is formed of permalloy having preferably approximately 78½% nickel and 21½% iron. Although it is preferred to have the entire field structure formed of laminations of permalloy the pole-pieces may be formed of ferrous material. It is possible to form the pole-pieces of ferrous material if so desired, inasmuch as the hysteresis effect of such a small part of the magnetic circuit will have a negligible effect on the speed of the motor.

In order to prevent variations in the motor speed due to change in temperature of the field windings, the field coils are wound for low voltage and preferably about one-quarter of the line voltage and are connected across the supply lines in series with a relatively high resistance element which consumes approximately 75% of the line voltage.

Load variations on a motor vary the voltage drop of the armature circuit. Such drop in the voltage of the armature circuit may tend to interfere with the holding of the motor speed constant. In order to compensate for any effect that may be caused by reason of the change in the armature resistance the commutator brushes are given a suitable backward shift so as to exert a demagnetizing effect upon the field which will reduce the field flux by a sufficient amount to neutralize the change in the voltage drop due to changes in armature resistance. This backward shift of the commutator brushes is also desirable to secure the best brush position from a commutation standpoint.

In the accompanying drawing Figure 1 is a sectional elevational view of a motor constructed in accordance with the invention;

Figure 1:
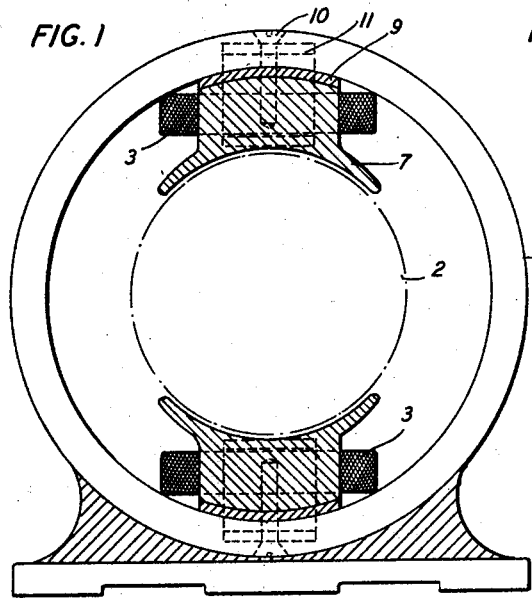
Figure 2:
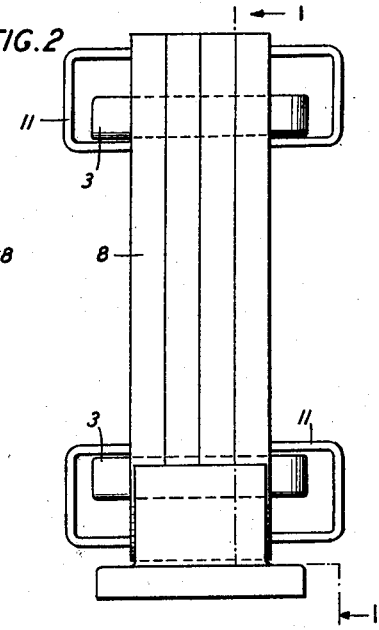
Fig. 2 is a side elevational view of the motor shown in Fig. 1.
Figure 3:
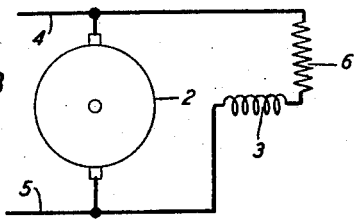
Fig. 3 is a circuit diagram of a motor constructed in accordance with the invention.

Referring to Figs. 1, 2 and 3 of the drawing, a motor 1 is shown comprising an armature 2 and a shunt field winding 3. The armature 2 is connected across a direct current supply line comprising conductors 4 and 5. The field winding 3 is connected across the supply conductors 4 and 5 in series with a resistance element 6. The resistance element 6 preferably consumes 75% of the line voltage and the field winding is wound to consume approximately 25% of the line voltage. Due to the positive temperature coefficient of copper wire, changes in the resistance of the field coils are produced by temperature changes. The providing of a relatively high resistance element in series with the field winding reduces the resistance changes of the field circuit to a negligible value. The loss in efficiency by reason of the resistance element is small as compared with the correction effected in the speed characteristic of the motor.

The field yoke 8 is formed of plates of permalloy. The permalloy plates are preferably composed of 78½% nickel and 21½% ferrous material. Each of the permalloy plates preferably should not exceed ½ inch in thickness. The pole-pieces 7 which support the field winding 3 preferably are composed of permalloy but if so desired such pole-pieces may be composed of iron. The pole-pieces form such a small length of the magnetic field circuit that it is possible to use iron without materially affecting the operation of the motor. The hysteresis effect caused by having the pole-pieces formed of iron is so small as not to be noticeable in the operation of the motor.

A non-magnetic gap 9 is provided between each pole-piece and the field yoke. This non-magnetic gap may be an air-gap but is preferably a plate of brass or copper or other non-magnetic material. Two bolts 10 of brass are provided for securing each pole-piece to the field yoke. Secured to the field yoke and the pole-pieces are magnetic shunts 11 which serve to shunt a portion of the field flux away from the armature. The magnetic shunts 11 are secured to the yoke and the pole-pieces in any well known manner and are preferably composed of iron. Any other like arrangement of the magnetic shunts may be adopted so that a portion of the field flux is shunted away from the armature. Preferably the magnetic shunts have a flux capacity of approximately 15% of the total pole flux. Although the illustrated motor has only two field poles, it is to be understood that the motor if so desired may be provided with any suitable number of poles.

Figure 4:
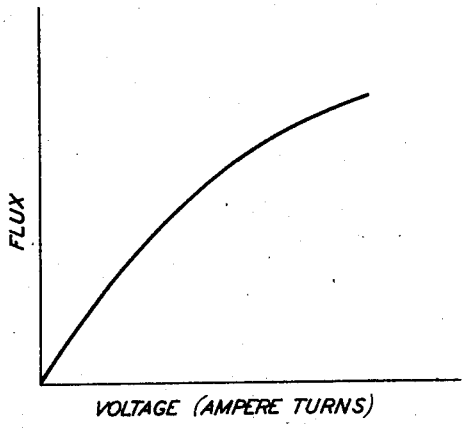
Fig. 4 shows a magnetization curve for standard shunt wound motor.

Fig. 4 shows the magnetization curve of a standard shunt wound motor. This magnetization curve shows that the flux is not proportional to the line voltage. To obtain a motor which operates at constant speed with fairly close precision it is necessary to have the flux directly proportional to the line voltage. The truth of the above statement is apparent when we consider the motor equation $$E_0 = IR + E_1$$

where $E_0$ is the line voltage, $IR$ the resistance drop of the armature, $E_1$ circuit and the counter E. M. F. of the motor.

The counter E. M. F. of the motor may be considered equal to a constant $\times$ the speed $\times$ the flux. Making this substitution in the above formula we have $E_0 = IR + K\Phi S$. The quantity $IR$ is generally negligible and may be dropped from the above equation. Consequently, we have $E_0 = K\Phi S$ or $$S = \frac{E_0}{K\Phi}$$

In other words to maintain the speed of a motor constant it is necessary to have the flux vary proportionately to the line voltage.

Referring again to the magnetization curve shown in Fig. 4, it is apparent there is no substantial portion of the curve which will be approximately on a straight line through the origin of the curve. In order to have the flux proportionate to the line voltage it is necessary that the operating portion of the magnetization curve must be on a straight line which extends through the origin.

Figure 5:
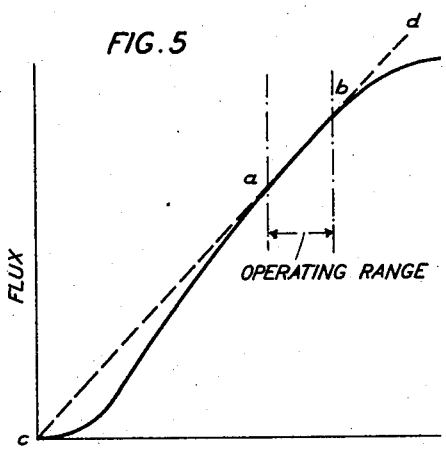
Fig. 5 shows a magnetization curve for a motor constructed in accordance with the invention.

In order to distort the magnetization curve shown in Fig. 4 the motor is provided with magnetic shunts 11 which shunt a portion of a field flux away from the armature. Such magnetic shunts tend to move the magnetization curve along the abscissa to obtain a curve similar to the one shown in Fig. 5 of the drawing. In the curve shown in Fig. 5 of the drawing the magneto motive force of the coils will have to reach a certain value before any flux is supplied to the armature. At first practically all the field flux is returned through the magnetic shunts and very little passes through the armature. By means of such magnetic shunts it is possible to obtain a portion of the magnetization curve which lies on a straight line extending through the origin. By providing non-magnetic gaps in the pole-pieces it is possible to further extend the range of operation and to insure an operating range at reasonably high flux densities.

The field structure being composed of permalloy insures that the magnetization curve is the same for a rising voltage as for a falling voltage. The armature punchings need not be made of permalloy, since the rotation of the armature neutralizes any residual flux caused by hysteresis in the armature. In a standard motor it is, of course, apparent that the hysteresis caused by iron in the motor field structure will prevent the magnetization curve being exactly the same for a rising voltage as for a falling voltage, in spite of the fact that the air gaps between field and armature reduce this effect.

In order to take care of load variations which tend to cause the speed to vary, the commutator brushes are shifted backward a slight amount to exert a small de-magnetizing effect on the field. Referring again to the equation $E_0 = IR + K\Phi S$ it may be noted that an increase in the load will increase the IR drop. However, the armature produces a magneto motive force which with a suitable backward shift of the commutator brushes can exert a demagnetizing effect upon the field which will reduce the field flux $\Phi$ by a sufficient amount to neutralize the increase in the armature IR drop. Moreover, the backward shifting of the commutator brushes is desirable to secure the best position from a commutation standpoint.

Modifications in the structure and in the arrangement and location of parts may be made within the spirit and scope of the invention and such modifications are intended to be covered by the appended claims.

What is claimed is:

1. A constant-speed direct-current motor having an armature, a field winding, separate magnetic shunts positioned between the outer end of each field pole piece and the field yoke adjacent to the other end of the pole piece and enclosing the field winding that are substantially unaffected by the cross flux of armature reaction and displace the magnetization curve of the motor to have the operating portion thereof at relatively high flux densities on a straight line extending through the origin of magnetization curve, and means comprising a supporting member for the pole pieces composed of magnetic material free from hysteresis effects to obtain coinciding magnetization curves for the motor on rising and falling voltages and cooperating with the field winding to apply a field flux to the armature which is proportional with close precision to the line voltage applied to the armature.

2. A constant-speed direct-current motor having an armature, a shunt field winding, a relatively high resistance element connected in series with said field winding across the armature terminals to reduce the changes in field current for changes in temperature of the motor, and means comprising a field supporting member free from hysteresis effects for obtaining similar magnetization curves for the motor on rising and falling voltages and cooperating with said field winding to apply a field flux to the armature which is directly proportional to the line voltage applied to the armature.

3. A constant-speed motor having an armature, a shunt field winding, and means comprising magnetic shunts associated with the field pole pieces for shunting a portion of the field flux from the armature to displace the magnetization curve of the motor and have the operating portion thereof at relatively high flux density on a straight line extending through the origin of the magnetization curve and a supporting member for said field winding composed of magnetic material free from hysteresis effects to obtain similar magnetization curves for the motor on rising and falling voltages and cooperating with the field winding to produce a field flux applied to the armature which is directly proportional to the line voltage applied to the armature.

4. A constant-speed direct-current motor having an armature, a field winding, a relatively high resistance element connected in series with said field winding across the armature terminals to reduce the changes in field current for changes in temperature of the motor, and means comprising a supporting member for said field winding composed of magnetic material free from hysteresis effects to obtain similar magnetization curves for the motor on rising and falling voltages and cooperating with the field winding to produce a field flux applied to the armature which is directly proportional to the line voltage applied to the armature.

5. A constant-speed direct-current motor having a field flux applied to the armature which is proportional with close precision to the line voltage applied to the armature and comprising an armature, a shunt field winding, a field structure carrying said field winding and composed of permalloy to obtain similar magnetization curves for the motor on rising and falling voltages, and magnetic shunts associated with the field pole-pieces for shunting a portion of the field flux from the armature to displace the magnetization curve of the motor and have the operating portion thereof at relatively high flux density on a straight line extending through the origin of the magnetization curve.

6. A constant-speed direct-current motor comprising an armature, a shunt field winding, and means cooperating with the field winding for applying a field flux to the armature which is proportional with close precision to the line voltage applied to the armature and comprising a relatively high resistance element connected in series with said field winding across the armature terminals to reduce the changes in field current for changes in temperature of the motor, a field structure carrying said field winding and composed of permalloy to obtain similar magnetization curves for the motor on rising and falling voltages, and magnetic shunts associated with the field poles for shunting a portion of the field flux from the armature to displace the magnetization curve of the motor and have the operating portion thereof at relatively high flux density on a straight line extending through the origin of the magnetization curve.

7. A constant-speed direct-current motor comprising an armature winding, a core member of ferrous material for supporting said armature winding, a shunt field winding and means cooperating with the field winding for applying a field flux to the armature which is proportional with close precision to the line voltage and comprising a relatively high resistance element connected in series with the field winding across the terminals of the armature winding, a core member composed of laminations of permalloy for supporting said field winding and for obtaining similar magnetization curves for the motor on rising and falling voltages, and magnetic shunts associated with the field poles for shunting a portion of the field flux from the armature to displace the magnetization curve of the motor and have the operating portions thereof at relatively high flux density on a straight line extending through the origin of the magnetization curve.

8. A constant speed direct current motor having an armature, a field winding, and magnetic shunts associated with the field pole pieces and positioned to be substantially unaffected by the cross flux of armature reaction, said magnetic shunts displacing the magnetization curve of the motor to effect operation of the motor at relatively high flux density on a portion of the magnetization curve lying on a straight line extending through the origin of the curve.

9. A constant speed direct current motor having an armature, a field winding, and separate magnetic shunts positioned between the outer end of each pole piece and the field yoke adjacent to the other end of the pole piece and enclosing the field winding that are substantially unaffected by the cross flux of armature reaction, said magnetic shunts displacing the magnetization curve of the motor to effect operation of the motor at relatively high flux density on a portion of the magnetization curve lying on a straight line extending through the origin of the curve.

10. A constant-speed direct-current motor having a field flux applied to the armature which is proportional with close precision to the line voltage applied to the armature and comprising an armature winding mounted on a supporting core member of ferrous material, a field winding mounted on a core member composed substantially of permalloy to obtain similar magnetization curves for the motor on rising and falling voltages, and magnetic shunts associated with the field pole pieces for shunting a portion of the field flux from the armature to displace the magnetization curve of the motor and have the operating position thereof at relatively high flux density on a straight line extending through the origin of the magnetization curve.

In witness whereof, I hereunto subscribe my name this 30th day of September, 1930.

HUGH M. STOLLER.